United States Patent [19]
Volkmann et al.

[11] Patent Number: 5,438,181
[45] Date of Patent: Aug. 1, 1995

[54] APPARATUS FOR HEATING SUBSTRATE HAVING ELECTRICALLY-CONDUCTIVE AND NON-ELECTRICALLY-CONDUCTIVE PORTIONS

[75] Inventors: Curtis L. Volkmann, Brighton; Frederick A. Buck, Milford, both of Mich.

[73] Assignee: Essex Specialty Products, Inc., Clifton, N.J.

[21] Appl. No.: 166,430

[22] Filed: Dec. 14, 1993

[51] Int. Cl.[6] ............................ H05B 6/10; H05B 6/80
[52] U.S. Cl. ................................. 219/601; 219/633; 219/635; 219/656; 219/676; 219/680
[58] Field of Search ............... 219/601, 633, 635, 638, 219/647, 649, 656, 676, 680

[56] References Cited
U.S. PATENT DOCUMENTS

| | | |
|---|---|---|
| 1,799,102 | 3/1931 | Kelley ............................ 219/601 |
| 3,396,258 | 8/1968 | Leatherman ..................... 219/633 |
| 3,659,552 | 5/1972 | Briody ............................ 219/647 |
| 3,665,139 | 5/1972 | Steggewentz .................... 219/601 |
| 4,128,449 | 12/1978 | Kobetsky . | 
| 4,243,460 | 1/1981 | Nagler . |
| 4,340,801 | 7/1982 | Ishibashi et al. ................ 219/657 |
| 4,386,650 | 6/1983 | Moen . |
| 4,535,222 | 8/1985 | Moen . |
| 4,602,139 | 7/1986 | Hutton et al. . |
| 4,650,947 | 3/1987 | Hutton et al. . |
| 4,654,495 | 3/1987 | Hutton et al. . |
| 4,749,833 | 6/1988 | Novarsky et al. . |
| 4,950,348 | 8/1990 | Larsen . |
| 4,969,968 | 11/1990 | Leatherman . |
| 5,068,516 | 11/1991 | Ki-Joon ......................... 219/388 |

FOREIGN PATENT DOCUMENTS

| | | | |
|---|---|---|---|
| 464390 | 1/1992 | European Pat. Off. ............ 219/601 |
| 615067 | 1/1961 | Italy ............................... 219/601 |
| 60-126643 | 7/1985 | Japan . | |
| 50-123590 | 3/1959 | U.S.S.R. ........................ 219/601 |

OTHER PUBLICATIONS

Zinn, S. and Semiatin, S. L., *Elements of Induction Heating,* (1988), Chapters 1, 2, 4 and 11).

Huang, G. C., "Investigations of Heat-Transfer Coefficients for Air Flow Through Round Jets Impinging Normal to a Heat-Transfer Surface", Journal of Heat Transfer, Aug. 1963, pp. 237–245.

Kercher, D. M., "Heat Transfer by a Square Array of Round Air Jets Impinging Perpendicular to a Flat Surface Including the Effect of Spent Air", Journal of Engineering for Power, Jan. 1970, pp. 73–82.

Chance, J. Larry, "Experimental Investigation of Air Impingement Heat Transfer Under an Array of Round Jets", Tappi, vol. 57, Jun. 1974, pp. 108–112.

*Primary Examiner*—Philip H. Leung
*Attorney, Agent, or Firm*—Cargill and Associates

[57] ABSTRACT

An apparatus includes (a) a device which is capable of selectively generating heat in electrically-conductive material without substantially generating heat in non-electrically-conductive material, (b) a device capable of heating non-electrically-conductive material, and (c) an insulating shield between the two devices to help focus the energy generated by at least one of the devices.

26 Claims, 2 Drawing Sheets

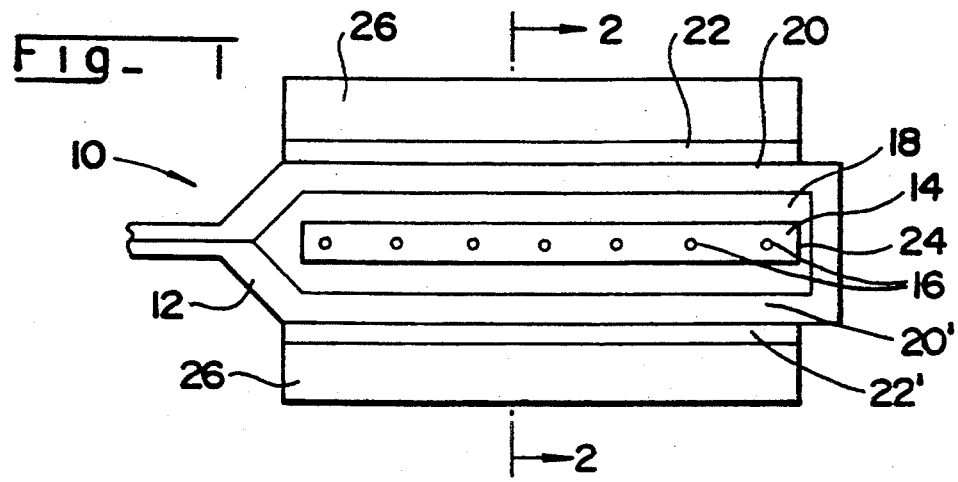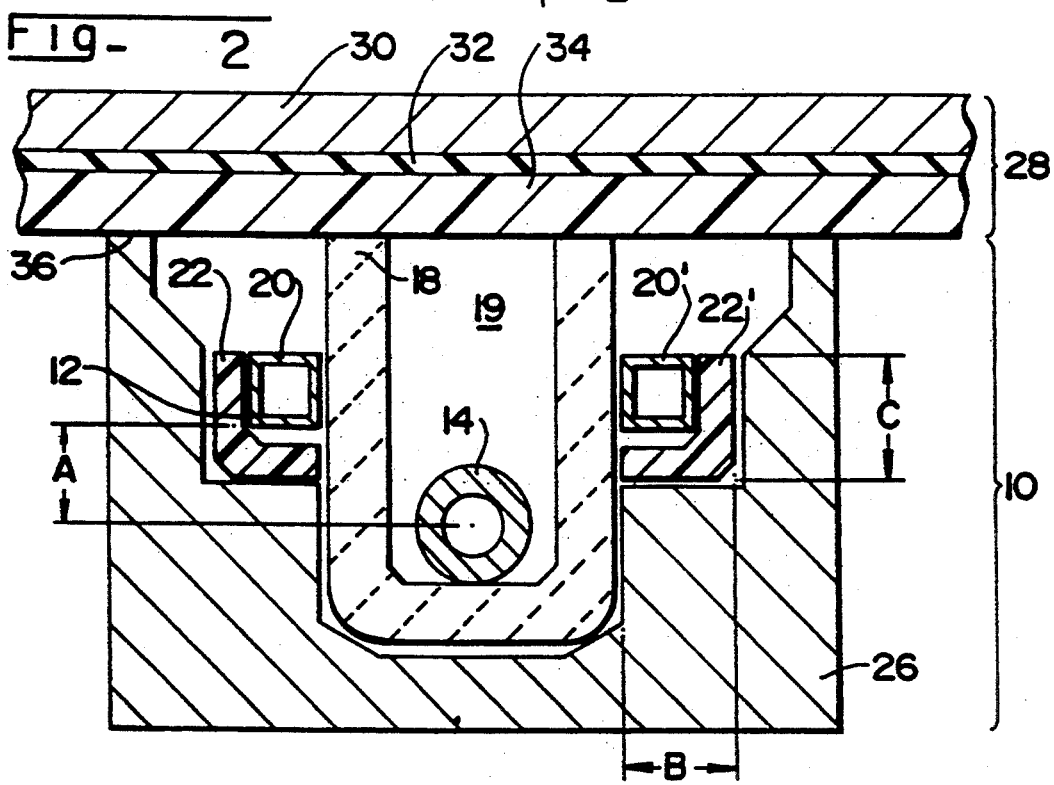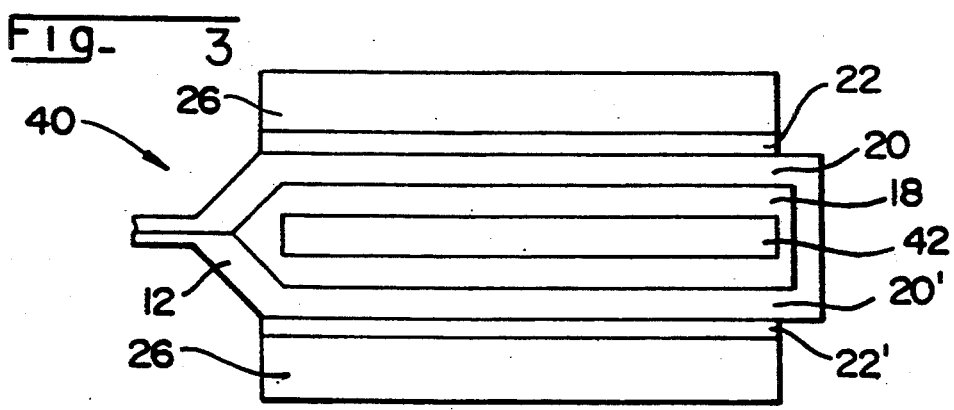

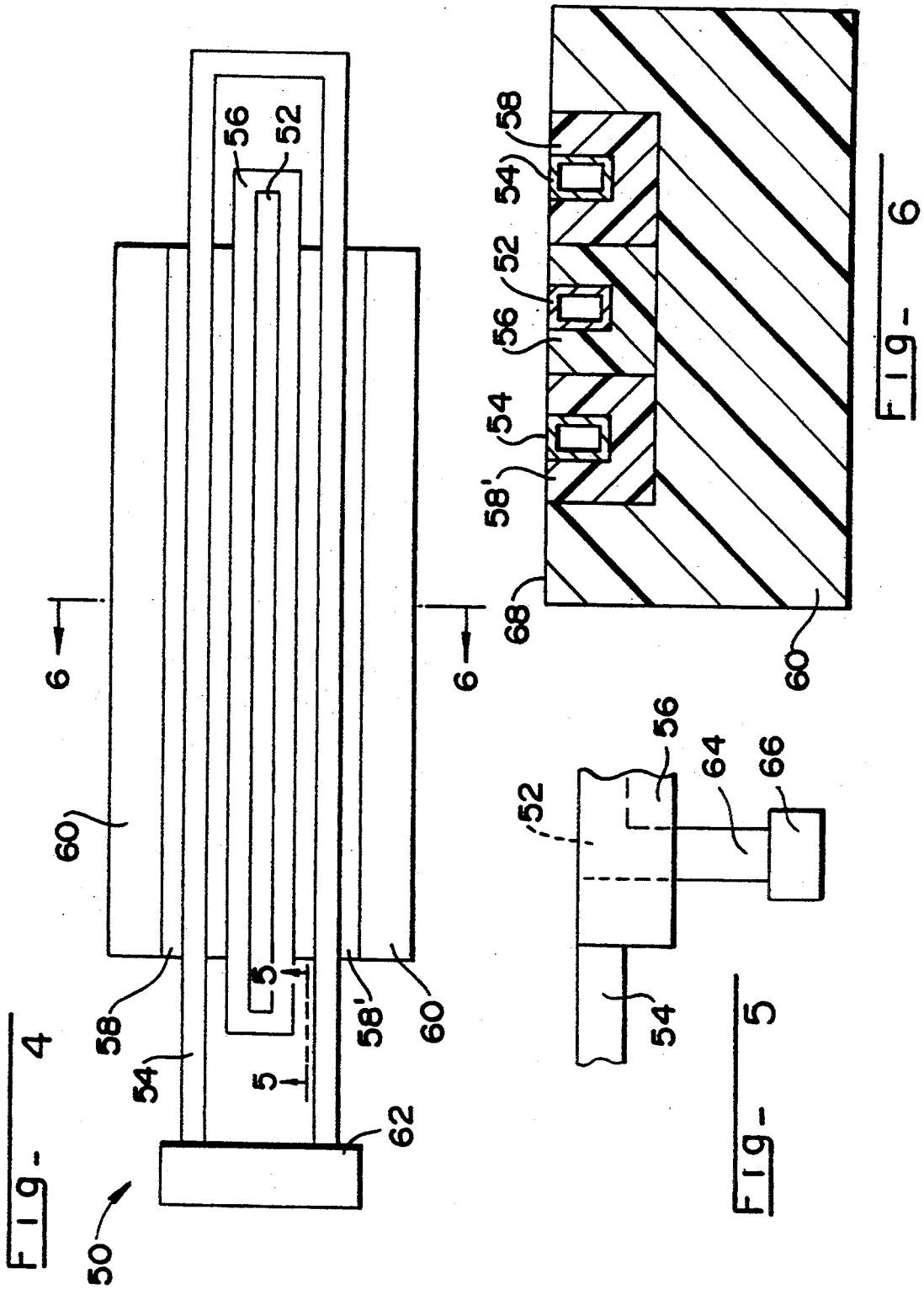

APPARATUS FOR HEATING SUBSTRATE HAVING ELECTRICALLY-CONDUCTIVE AND NON-ELECTRICALLY-CONDUCTIVE PORTIONS

TECHNICAL FIELD

This invention relates generally to a heating apparatus and, more specifically, to an apparatus for heating a substrate having an electrically-conductive portion and a non-electrically-conductive portion.

BACKGROUND OF THE INVENTION

Especially in the automotive industry, there is a trend toward using more non-metallic materials, e.g., thermoplastic or thermoset materials. In automobiles, these materials are often used for forming body panels which are bonded to metal frames or metal unibodies. Adhesives are used to bond the non-metallic body panels to the metallic frames or unibodies. Currently, a method using plastic "mill and drill pads" is used to secure the metallic and non-metallic parts together long enough for adhesive between them to fully cure. In this method, plastic pads on the body panel are milled to fit the metal frame and drilled for insertion of a screw which secures the metal frame and the body panel together until full cure of the adhesive is accomplished. Usually, full cure of the adhesive occurs when the body panels are passed through dry-off or paint-curing ovens.

However, the currently used mill-and-drill-pad method is labor and time intensive and, therefore, expensive for the auto manufacturer and, finally, for the consumer.

It is, therefore, desirable to be able to eliminate the need for the mill-and-drill-pad procedure. One such way would be to accelerate the cure of the adhesive so that it is at least partially cured and has enough strength to keep the metallic and non-metallic parts together until they reach the paint-curing ovens.

During automobile production, body panels are attached to the frame and the frame quickly becomes enclosed, making it difficult to maneuver equipment inside the frame. Therefore, it would also be desirable to accomplish the adhesive cure acceleration by approaching the substrate from the outside only.

It is, therefore, an object of the present invention to provide an apparatus for easily and inexpensively heating a substrate having an electrically-conductive portion and a non-electrically-conductive portion.

It is another object of the present invention to provide an apparatus which accelerates the curing of an adhesive between an electrically-conductive material and a non-electrically-conductive material without damaging the adhesive or the electrically-conductive or non-electrically-conductive materials.

It is another object of the present invention to provide an apparatus which accelerates the curing of an adhesive between a steel space frame and a plastic automotive body panel so that mill and drill pads are unnecessary.

It is yet another object of the present invention to provide an apparatus which would efficiently heat a substrate using access from only one side of the substrate.

SUMMARY OF THE INVENTION

In accordance with a preferred embodiment of the invention, these and other objects and advantages are addressed as follows.

An apparatus is disclosed for heating a substrate having an electrically-conductive portion and a non-electrically-conductive portion which includes (a) a first device capable of selectively generating heat in the electrically-conductive portion without substantially generating heat in the non-electrically-conductive portion, (b) a second device capable of heating the non-electrically-conductive portion, (c) an insulating shield between the first and second devices to help focus the energy generated by at least one of the devices to the substrate, and (d) means for holding the first and second devices and insulating shield together.

In a more specific embodiment, the heating apparatus has a heat-directed side and may be used for heating a laminate having a metallic layer, a non-metallic layer, and an adhesive therebetween. The apparatus includes (a) an induction coil having at least two passes, (b) a non-induction heating device capable of heating the non-metallic layer, the non-induction heating device being positioned between the two passes of the induction coil, (c) an insulating shield between the two passes of the induction coil and the non-induction heating device, (d) a focusing shield adjacent each side of the passes of the induction coil opposite the non-induction heating device and adjacent each side of the passes of the induction coil opposite the heat-directed side, and (e) means for holding the induction coil, the non-induction heating device, the insulating shield and the focusing shield together. The insulating shield is present to help focus the energy generated by at least one of either the induction coil or the non-induction heating device to the laminate. The focusing shield is present to assist in focusing the induction field created by the induction heating device to the laminate.

In another embodiment of the invention, a heating apparatus is disclosed, also having a heat-directed side, which may be used for heating a laminate having a metallic layer, a non-metallic layer, and an adhesive therebetween. The heating apparatus includes (a) a low-frequency induction heating device capable of being operated at a frequency of from about 1 to about 50 KHz, (b) a high-frequency heating device capable of being operated at a frequency of from about 25 KHz to about 300 MHz, (c) an insulating shield between the induction heating devices to help focus the energy generated by either of the induction heating devices to the laminate, (d) a focusing shield adjacent each side of at least one of the induction heating devices which is opposite the other induction heating device and adjacent each side of the at least one of the induction heating devices which is opposite the heat-directed side, the focusing shield present to assist in focusing the induction field created by the at least one of the induction heating devices to the laminate, (e) means for holding the induction heating devices, the insulating shield and the focusing shield together, (f) a low-frequency induction generator capable of supplying a frequency of from about 1 to about 50 KHz electrically connected to the low-frequency induction heating device, and (g) a high-frequency generator capable of supplying a frequency of from about 25 KHz to about 300 MHz electrically connected to the high-frequency heating device.

BRIEF DESCRIPTION OF THE DRAWINGS

The nature and extent of the present invention will be clear from the following detailed description of the particular embodiments thereof, taken in conjunction with the appendant drawings, in which:

FIG. 1 illustrates a front elevational view of one embodiment of an apparatus constructed in accordance with the present invention;

FIG. 2 illustrates a cross-sectional view of the apparatus of FIG. 1 taken along line 2—2 of FIG. 1 shown with a substrate to be heated by the apparatus;

FIG. 3 illustrates a front elevational view of another embodiment of an apparatus of the present invention;

FIG. 4 illustrates a front elevational view of another embodiment of an apparatus of the present invention;

FIG. 5 illustrates a side elevational view of a portion of the apparatus shown in FIG. 4 as seen from line 5—5; and FIG. 6 illustrates a cross-sectional view of the apparatus shown in FIG. 4 taken along line 6—6.

DETAILED DESCRIPTION OF THE INVENTION

The present invention generally entails an apparatus for heating a substrate which includes an electrically-conductive portion and a non-electrically-conductive portion. The apparatus includes (a) a first device capable of selectively generating heat in the electrically-conductive portion without substantially generating heat in the non-electrically-conductive portion, (b) a second device capable of heating the non-electrically-conductive portion, (c) an insulating shield between the first and second devices to help focus the energy generated by at least one of the devices to the substrate, and (d) means for holding the first and second devices and the insulating shield together.

Referring first to FIG. 1, one embodiment of an apparatus constructed in accordance with the present invention is generally denoted by the numeral 10. Apparatus 10 includes induction heating device 12 and a non-induction heating device, particularly, hot-fluid ejection tube 14 having a plurality of holes 16 therein at the top of the tube through which hot fluid may be ejected. Induction heating device 12 is capable of selectively generating heat in electrically-conductive material and hot-fluid ejection tube 14 equipped with a source of hot fluid is capable of heating non-electrically-conductive material.

Induction is a method of heating electrically-conductive materials by inducing electrical currents within the material to be heated. The basic components of an induction heating system are an induction coil and an alternating-current power supply or induction generator. The coil, which may take different shapes depending on the required heating pattern, is connected to the power supply. The flow of alternating current through the coil generates an alternating magnetic field which travels into the material to be heated. The alternating magnetic field induces eddy current in the material to be heated that heats the material to be heated. Induction coils and induction generators are readily known devices which are commercially available.

Between induction heating device 12 and hot-fluid ejection tube 14 is insulating shield 18 which helps focus hot fluid from hot-fluid ejection tube 14 to the substrate, reduces the heating of tube 14 by induction heating device 12, and reduces the heating of induction heating device 12 by ejected hot fluid during operation. Insulating shield 18 creates channel 19 by enclosing hot-fluid ejection tube 14 on three sides, which is better seen in FIG. 2.

Induction heating device 12 is in the form of a water- or air-cooled induction coil, having two passes 20 and 20'. Hot-fluid ejection tube 14 is placed between passes, 20 and 20'. On the outside of passes 20 and 20' there are focusing shields 22 and 22' which help focus energy from the induction coil to the substrate.

Pressurized hot fluid for hot-fluid ejection tube 14 may be supplied through tubing (not shown) which may be attached to hot-fluid ejection tube 14 at end 24. Tube 14 and supply tubing may be designed to be securely connected by threading, compression fitting, or any other known technique for connecting tubes together.

The hot fluid may be hot air, steam, or other suitable gas or liquid. Preferably, the hot fluid is superheated. Most preferably, the hot fluid is superheated air. Devices which have been found especially suitable for making superheated air for the apparatus of this invention are disclosed by Moen in U.S. Pat. Nos. 4,386,650 and 4,535,222, which patents are hereby incorporated by reference.

The components of the apparatus are held together by means for holding or housing 26 which is seen on the outsides of focusing shields 22 and 22' which can best be seen in FIG. 2. Housing 26 may be formed of, e.g., wood or any heat-stable thermoplastic, such as tetrafluoroethylene polymer.

FIG. 2 shows a cross section of apparatus 10, the cross section being taken along line 2—2 of FIG. 1, with substrate 28 to be heated by apparatus 10. Substrate 28 is composed of metallic layer 30, adhesive 32, and plastic layer 34. Substrate 28 may be, e.g., an automotive body panel laminated with a prepainted steel space frame. Substrate 28 is shown in the preferred position, that is, flush with insulating shield 18 at the front side or heat-directed side 36 of apparatus 10 with the plastic layer closest to apparatus 10. Placing substrate 28 flush with insulating shield 18 ensures that the maximum amount of heat transfer from the hot fluid from hot-fluid ejection tube 14 is supplied to substrate 28 during operation of apparatus 10. Alternatively, substrate 28 may be placed a distance away from apparatus 10; however, the heating efficiency of the apparatus will be reduced.

The outer diameter of the hot-fluid ejection tube 14 is desirably sized to have a low pressure drop and allow a high velocity of fluid flow. The vertical distance between the outer surface of induction coil passes 20 or 20' and the center of hot-fluid ejection tube 14 (this distance is indicated by reference letter "A" in FIG. 2) should be greater than the radius of hot-fluid ejection tube 14 to minimize the tube's absorption of energy from the induction field created by the coils.

During operation of the apparatus, metallic layer 30 is heated by induction heating device 12, and plastic layer 34 is heated by hot fluid from hot-fluid ejection tube 14. The heat generated in both of these layers is transferred to adhesive 32 therebetween to thereby accelerate the cure of the adhesive or the melting of the adhesive in the case of a hot-melt adhesive.

As can be seen in FIG. 2, insulating shield 18 is located on the two opposite sides of hot-fluid ejection tube 14 which are perpendicular to heat-directed side 36. Insulating shield 18 extends beyond hot-fluid ejection tube 14 in the direction of the heat-directed side 36, creating a channel adjacent hot-fluid ejection tube 14 in the direction of heat-directed side 36. Insulating shield 18 also runs along the side of hot-fluid ejection tube 14 opposite the heat directed side 36. Thus, insulating shield 18 is essentially U-shaped. The purpose of insulating shield 18 is to reduce mixing of ejected hot fluid with ambient air, focus hot fluid from hot-fluid ejection tube 14 to substrate 28, minimize the heating of tube 14 by induction heating device 12, and minimize the heating of induction heating device 12 by hot-fluid ejection tube 14 during operation.

Insulating shield 18 may be formed of a material which can insulate with respect to any kind of energy, e.g., thermal energy or electromagnetic energy, depending on the particular design of the heating apparatus. When the heating apparatus employs a hot-fluid ejection tube as shown in FIGS. 1 and 2, insulating shield 18 is preferably formed of a material which provides thermal insulation, such as a thermoset plastic material having a high glass-transition temperature.

Focusing shields, such as focusing shields 22 and 22', are preferably positioned adjacent at least one side of the first heating device which is not adjacent to the second device to assist in focusing the energy created by the first heating device to the substrate. Focusing shields 22 and 22' are formed of a material which acts as a magnetic insulator, e.g., plastics, such as "FERRITRON" available from Polymer Corporation, Writing, Pa., or "FLUXTROL" available from Fluxtrol, Inc., Troy, Mich.

Focusing shields 22 and 22' are shown adjacent the sides of passes 20 and 20' which are opposite heat-directed side 36 and opposite the sides adjacent hot-fluid ejection tube 14. In other words, focusing shields 22 and 22' enclose induction coil passes 20 and 20' at the backside and the outside of the coil passes. Desirably, at the backside and at the outside, focusing shields 22 and 22' are at least as long as the coil pass is wide. If housing 26 is formed of an electrically-conductive material, the lengths of focusing shields 22 and 22' at the side of coil passes 20 and 20' should be longer than the width of the coil passes to shield housing 26 from operation of the induction coils.

FIG. 3 shows a front elevational view of another embodiment of an apparatus of the present invention generally denoted by numeral 40. The components of apparatus 40 are shown to be the same as those for apparatus 10, except hot-fluid ejection tube 14 of apparatus 10 has been replaced by alternate heating device 42. Alternate heating device 42 may be a device for supplying microwaves or radio waves. The dimensions and design of apparatus 40 may vary from apparatus 10 depending upon the specific application.

Employing alternate heating device 42 allows for tailored curing of substrates. For example, a laminate formed of a layer of glass and a layer of metal with a layer of adhesive containing water therebetween can be heated with a heating apparatus which has an induction heating device and a microwave heating device. The heating apparatus may be focused on the glass layer, yet the heating occurs in the metal and adhesive layers first.

FIG. 4 shows a front view of another embodiment of an apparatus of the present invention generally denoted by numeral 50. Apparatus 50 has one-pass induction coil 52 between the two passes of two-pass induction coil 54. Around induction coil 52 is insulation shield 56. Around the passes of induction coil 54 are focusing shields 58 and 58'. Housing 60 holds induction coils 52 and 54 and shields 56, 58, and 58' together. Induction coil 54 is electrically connected to induction generator 62 which is a source of alternating-current power.

FIG. 5 is a side view of a portion of apparatus 50 seen from line 5—5 of FIG. 4. Single-pass induction coil 52 is shown turning downward at end 62 and electrically connected to induction generator 66. Similarly, at the other end of apparatus 50, induction coil 52 turns downward and is electrically connected to induction generator 66.

FIG. 6 is a cross-sectional view of apparatus 50 taken along line 6—6 of FIG. 4. Induction coils 52 and 54 are shown as water-cooled induction coils. Apparatus 50 has heat-directed side 68. Shields 56, 58, and 58' are each U-shaped and surround the respective induction coils on three sides, as shown.

Preferably, induction coil 52 is a high-frequency coil, induction generator 64 is a high-frequency generator, induction coil 54 is a low-frequency induction coil, and induction generator 62 is a low-frequency induction generator. Preferably, coil 52 operates at a frequency at least about five times the frequency of induction coil 54 during operation. More preferably, the frequency of coil 52 is at least about ten times the frequency of induction coil 54 during operation, and, most preferably, the frequency of coil 52 is at least about one hundred times the frequency of induction coil 54. Correspondingly, the high-frequency generator has a frequency rating appropriately selected which is at least about five, ten, or one hundred times greater than the frequency rating of the low-frequency induction generator.

The low-frequency induction generator preferably has a frequency rating of from about 1 KHz to about 50 KHz, i.e., it is capable of supplying a frequency of from about 1 KHz to about 50 KHz. More preferably, the low-frequency induction generator has a frequency rating of from about 1 to about 15 KHz. The high-frequency generator preferably has a frequency rating of from about 25 KHz to about 300 MHz, and, more preferably, from about 50 KHz to about 300 KHz.

Low-frequency induction coil 52 is capable of generating heat in electrically-conductive materials without substantially generating heat in nearby non-electrically-conductive materials. High-frequency coil 54 is capable of heating non-electrically-conductive materials, and, in some cases, the heating is enhanced by lacing the non-electrically-conductive materials with magnetic metal oxides or metal filings. For some applications, coils 52 and 54 may be operated such that coil 52 is the low-frequency induction coil and coil 54 is the high-frequency coil.

The typical type of substrate to be heated by the apparatus of this invention is shown in FIG. 2, although other forms of substrates would benefit from this invention also. For example, a laminate consisting of two adjacent non-electrically-conductive layers and one electrically-conductive layer, all layers having adhesive therebetween, would benefit from this invention. As another example, a laminate consisting of two electrically-conductive layers and one non-electrically-conductive layer would benefit from this invention. As a third example, the substrate may merely be a composite material formed of a hardenable polymeric substance having metallic particles embedded therein. As a fourth example, if the apparatus is positioned such that the heating device used to heat the non-electrically-conductive portion is not blocked by metal, the substrate may be two electrically-conductive layers with an adhesive therebetween, the adhesive having a non-electrically-conductive portion.

The electrically-conductive portion of the substrate may be formed, in whole or in part, of metal, e.g., steel, aluminum, iron, or nickel. The non-electrically-conductive portion may be formed of any material which is considered substantially transparent to an electric field applied by a low-frequency induction heating device. It may be thermoplastic or thermoset material, e.g., polycarbonate, glass, or "sheet molding compound." "Sheet molding compound" is typically a fiberglass-reinforced epoxy-based thermoset plastic.

When the substrate is a laminate with an adhesive between layers, the adhesive can be a structural adhesive, a pressure sensitive adhesive or a hot-melt adhesive. Structural adhesives are typically those adhesives which are polymeric and convert upon exposure to energy from a low molecular weight species to a high molecular weight species. Pressure sensitive adhesives are typically formed of a tackifier and a resin and adhere upon light pressure. Hot-melt adhesives are polymeric materials which melt at elevated temperatures and solidify upon cooling. The adhesive may be a one-component adhesive or a multi-component adhesive. The adhesive may also contain metallic particles which increase in temperature when exposed to an inductive field produced by the induction heating device, thereby further accelerating the cure of the adhesive. Examples of suitable adhesives include epoxy-based, urethane-based, acrylic-based, silicone-based, and hybrids thereof.

The first heating device used in this invention, i.e., the device capable of selectively generating heat in electrically-conductive material, does not substantially generate heat in non-electrically-conductive material. For example, when the apparatus of this invention is facing the non-metallic layer of a laminate consisting of a metallic layer and a non-metallic layer, the first heating device generates heat in the metallic layer and does not substantially generate heat in the non-metallic layer. The non-metallic layer is said to be "transparent" to the heating of the first heating device. The phrase "without substantially generating heat in the non-electrically-conductive material" is used to mean that less than about 5 percent of the energy generated is generated in the non-electrically-conductive material.

As disclosed above, the first heating device may be a low-frequency induction heating device. Typically, a low-frequency induction heating device is operated at a frequency of from about 1 to about 50 KHz, preferably at a frequency of from about 1 to about 5 KHz.

Although a two-pass induction coil is shown in the Figures, alternate designs may be employed in order to focus the field of energy to the desired location. It is preferred to have an even number of coil passes per number of hot-fluid ejection tubes. The distance between a pair of induction coils is preferably the minimum distance possible without causing substantial cancellation of the magnetic field between them.

Typically, in accelerating the cure of an adhesive between metallic and non-metallic layers, the induction heating device may be operated by a control system with about a 1-5 second ramp time to set point and a hold time at the set point from about 2-40 seconds. The controller may be tied to a thermocouple embedded in the metallic layer or to an infrared indicator aimed at the surface of the substrate.

The second heating device used in this invention may be any device which can heat non-electrically-conductive material, e.g., a hot-fluid ejection device, a device for generating microwaves, a device for generating high-frequency radio waves, or another high-frequency heating device.

When a hot-fluid ejection tube is used as the second heating device of this invention, the substrate is heated by convection. The hot-fluid ejection tube may be formed of any material which can withstand the heat and pressure of the hot fluid passing therethrough. The material may be, e.g., stainless steel.

When the hot-fluid ejection tube uses super-heated air, preferred air pressures are from about 10 to about 60 psi, more preferred air pressures are from about 30 to about 50 psi, preferred air temperatures are from about 250+ F. to about 750° F., and more preferred air temperatures are from about 375° F. to about 650° F. For the best results, if the air temperature is kept constant, the air pressure is controlled to begin operating at a high pressure, then to gradually decrease as the non-electrically-conductive material reaches the desired temperature. On the other hand, if air pressure is kept constant, the air temperature may be controlled to start at a temperature which is 300°-400° F. higher than the desired temperature of the non-electrically-conductive material and then to decrease to the desired non-electrically-conductive material temperature as the non-electrically-conductive layer reaches the desired temperature. The control of both the air pressure and temperature may be optimized for each particular application.

When hot fluid is ejected from the holes of a hot-fluid ejection tube, the ejecting hot fluid forms a cone-shaped pattern. The distance between the center of the holes in the hot-fluid ejection tube is preferably designed so that when the substrate is flush with heating apparatus, the resultant cone-shaped patterns created by ejected hot fluid overlap at the substrate.

Variations on the design of the apparatus from that which is illustrated in the Figures are possible. For example, two hot-fluid ejection tubes could be used adjacent each other with an induction coil on each side. For another example, nested sets of hot-fluid ejection tubes and induction coils could be used. These sets could consist of a U-shaped hot-fluid ejection device which is surrounded by a U-shaped induction coil.

In the configuration shown in the Figures, heat is directed in one direction. However, apparatuses made in accordance with the present invention may be used to direct heat radially, e.g., by spinning an apparatus similar to that shown in the Figures or by arranging multiple sets of the apparatus shown in the Figures in a radial pattern with the heat-directed sides facing outwardly.

The apparatus of this invention could be designed so that when an induction heating device is employed, the induction heating device could pivot relative to the substrate. The pivoting action would allow for a control of the level of energy applied to a desired location on the substrate. For example, oftentimes adhesive between laminate layers will vary in thickness from one point to the next. The apparatus of this invention could be equipped with a device for determining the thickness of the adhesive at a point along the laminate, e.g., a soundwave device, which directs the induction heating device to pivot for greater or lesser energy directed to the point along the laminate, depending on the thickness of the adhesive.

As another example, the pivoting of the heating device could be used to cure the adhesive in a laminate along an advancing front. For instance, the heating device could begin applying energy in a direction perpendicular to the substrate, which causes the adhesive closest the heating device to cure first. The heating device could then gradually pivot to advance curing further along the laminate. To achieve the same effect of pivoting the heating device, the focusing shields and/or insulating shields could be pivoted to control the direction of the energy from the heating device.

To use the apparatus of this invention, a laminate of an electrically-conductive layer and a non-electrically-conductive layer may be positioned adjacent to the heat-directed side of the apparatus by preferably placing the non-electrically-conductive layer near or on the heat-directed side of the apparatus. The apparatus is then operated to heat the laminate by both the first and second heating devices. The first heating device heats the electrically-conductive layer through the non-electrically-conductive layer, and the second device heats the non-electrically-conductive layer(s).

If the apparatus is used to heat a laminate having an adhesive between layers, the apparatus can be used to heat the entire laminate or it may be moved along periodically to heat the laminate in discrete locations to cause acceleration of the adhesive cure in discrete locations only.

The operation of the first and second heating devices may be controlled separately so that operation of the apparatus may be optimized for the particular substrate(s) used. Typically, the fastest heating rate and maximum temperature at the substrates are desired so long as the heating rate and temperatures do not deleteriously affect any portion of the substrate.

The control of the first and second heating devices may be based upon the temperature of any part of the substrate. In the alternative, control of the heating devices could be programmed once parameters for the specific situation are determined empirically. For the particular substrate to be heated, the operation of the induction heating device can be optimized.

When using the hot-fluid ejection tube, as disclosed above, after enough hot fluid has been delivered through the hot-fluid ejecting tube, cold fluid may be ejected through the tube to cool the substrate. When the substrate includes an adhesive, a cooling step after the heating step would be advantageous as the modulus and bond strength of the adhesive would be increased..

Thus, there is provided in accordance with the present invention, an apparatus for easily and inexpensively heating a substrate having an electrically-conductive portion and a non-electrically-conductive portion using access from only one side of the substrate. The apparatus of this invention can be used to accelerate the curing of an adhesive between an electrically-conductive material and a non-electrically-conductive material without damaging the adhesive or the electrically-conductive or non-electrically-conductive materials. In a specific application, the apparatus can be used for accelerating the cure of an adhesive between a steel space frame and a plastic automotive body panel so that mill and drill pads are unnecessary.

The following examples are illustrative only and should not be construed as limiting the invention which is properly delineated in the appended claims.

EXAMPLE

In this example, an adhesive in a sample laminate was cured using an apparatus constructed in accordance with this invention. The sample laminate was formed of a panel of Sheet Molding Compound (SMC) and a panel of steel with "BETAMATE" 73520, a urethane-modified acrylic adhesive available from Essex Specialty Products, Inc., Troy, Mich., between the panels. The panel of SMC was BUDD DSM 950-B available from the Budd Company, Madison Heights, Mi., and it measured $1'' \times 4'' \times \frac{1}{8}$. The panel of steel was prepainted cold rolled steel available from Advanced Coating Technology, Hillsdale, Mich., and measured $4'' \times 4'' \times 0.32$. To make the sample laminate, a line of adhesive was applied to the SMC panel near each end of the panel, extending the width of the panel. Two 6 mm glass beads were placed in each line of adhesive. The SMC panel with adhesive was then attached to the steel panel to form the sample laminate. The glass beads controlled the thickness of the adhesive to 6 mm thick. The sample laminate was then placed in contact with a heating apparatus made in accordance with this invention as shown in FIG. 2, with the SMC panel in contact with the heat-directed side of the heating apparatus. A clamp was used to hold the sample laminate to the heating apparatus.

The apparatus used for this example was structurally the same as that shown in FIGS. 1 and 2. The hot-fluid ejection tube was formed of stainless steel, the insulating shield was formed of glass reinforced epoxy resin, the focusing shields were formed of "FERRITRON", an epoxy resin containing iron oxide particles, available from the Polymer Corporation, Writing, Pennsylvania, and the housing was formed of tetrafluoroethylene polymer.

The distance from the top of the hot-fluid ejection tube to the substrate when the substrate was flush with the apparatus as shown in FIG. 2, was 13.9 mm. The distance between the induction coils was 26.5 mm. The thickness of the insulating shield between the hot-fluid ejection tube and the induction coils was 7.8 mm. The hot-fluid ejection tube had an outer diameter of 7.8 mm. The vertical distance between the outer surface of either induction coil pass and the center of hot-fluid ejection tube 14 was 2.4 mm (this distance is indicated by reference letter "A" in FIG. 2). The induction coils were square in cross-section having a width and depth of 6.3 mm. The length of the focusing shield at the back of the induction coils was 10.6 mm (this distance is indicated by reference letter "B" in FIG. 2). The length of the focusing shield at the side of the induction coils was 16.2 mm (this distance is indicated by reference letter "C" in FIG. 2). The width of the chamber formed by the U-shaped insulating shield around the hot-fluid ejection tube was 9.5 mm. The distance between the center of adjacent holes on the hot-fluid ejection tube was 19.9 mm and the holes were 0.038 inch in diameter.

An infrared thermometer, connected to the controller for the induction generator, having a set point of 400° F., was focused on the steel panel just above the induction coil. The induction coil was operated at a frequency of about 9.5–10 KHz and was controlled so that it would shut off when the temperature indicated by the temperature sensor would read 400° F. and would turn on when the temperature would read 390° F. 475° F. air was ejected from the hot-fluid ejection tube. To simulate plant operations where air pressure would normally be shut off between heating operations, the pressure of the air was initially ejected at 5 psig and quickly, increased to 40 psig. Heat-sensitive paint was applied to the outside surface of the SMC panel which indicated, upon observation, that the final temperature of the SMC did not exceed 325° F. Air pressure was regulated so that the temperature of the SMC panel did not exceed 325° F.

The adhesive was cured in 52 seconds by the above-described method. In comparison, when only the induction heating device was used, it took the adhesive 6 minutes to cure, and when only the hot-fluid ejection device was used, it took the adhesive 18 minutes to cure. Therefore, the curing rate of the adhesive using the apparatus of this invention is faster than what would be expected from the combination of the two heating sources.

While our invention has been described in terms of a specific embodiment, it will be appreciated that other embodiments could readily be adapted by one skilled in the art. Accordingly, the scope of our invention is to be limited only by the following claims.

What is claimed is:

1. An apparatus for heating a substrate having an electrically-conductive portion and a non-electrically-conductive portion, comprising:
   (a) a first device capable of selectively generating heat in the electrically-conductive portion without substantially generating heat in the non-electrically-conductive portion,
   (b) a second device capable of heating the non-electrically-conductive portion,
   (c) an insulating shield between the first and second devices to help focus the energy generated by at least one of the devices to the substrate, and
   (d) means for holding the first and second devices and the insulating shield together, the apparatus having a heat-directed front side so that the substrate may be heated by the apparatus when placed outside the apparatus at the heat-directed front side of the apparatus.

2. The apparatus of claim 1, wherein the first device is an induction heating device and the second device is a non-induction heating device.

3. The apparatus of claim 1, wherein the second device is capable of operating at a frequency at least about five times greater than the frequency at which the first device is capable of operating.

4. The apparatus of claim 1, wherein the second device is a hot-fluid ejection tube.

5. The apparatus of claim 1, wherein the second device is a device for generating microwaves.

6. The apparatus of claim 1, wherein the first device is an induction heating device capable of producing a frequency and the second device is a device for producing radio waves having frequencies at least five times greater than the frequency of the first device.

7. The apparatus of claim 1, wherein the insulating shield encloses the second device on three sides.

8. The apparatus of claim 1, wherein the first device is an induction heating device and the apparatus further comprises a focusing shield adjacent a side of the induction heating device which is not adjacent to the second device to assist in focusing the induction field created by the induction heating device to the substrate.

9. An apparatus having a heat-directed side, the apparatus for heating a substrate having an electrically-conductive portion and a non-electrically-conductive portion, the apparatus comprising:
   (a) a first device capable of selectively generating heat in the electrically-conductive portion without substantially generating heat in the non-electrically-conductive portion,
   (b) a second device capable of heating the non-electrically-conductive portion, the second device having two opposite sides which are perpendicular to the heat-directed side,
   (c) an insulating shield between the first and second devices to help focus the energy generated by at least one of the devices to the substrate, the insulating shield being located on the two opposite sides of the second device extending beyond the second device in the direction of the heat-directed side creating a channel adjacent the second device in the direction of the heat-directed side, and
   (d) means for holding the first and second devices and the insulating shield together.

10. The apparatus of claim 9, wherein the first device is an induction heating device and the second device is a non-induction heating device.

11. The apparatus of claim 9, wherein the second device is capable of operating at a frequency at least about five times greater than the frequency at which the first device is capable of operating.

12. The apparatus of claim 9, wherein the second device is a hot-fluid ejection tube.

13. The apparatus of claim 9, wherein the first device is an induction heating device capable of producing a frequency and the second device is a device for producing radio waves having frequencies at least five times greater than the frequency of the first device.

14. An apparatus for heating a substrate having an electrically-conductive portion and a non-electrically-conductive portion, comprising:
   (a) a first device, wherein the first device is a two-pass induction coil,
   (b) a second device placed between the two passes of the induction coil, the second device being capable of heating the non-electrically-conductive portion,
   (c) an insulating shield between the first and second devices to help focus the energy generated by at least one of the devices to the substrate, and
   (d) means for holding the first and second devices and the insulating shield together.

15. The apparatus of claim 14, wherein the apparatus has a heat-directed side and further comprises a focusing shield adjacent the side of the induction coil opposite the heat-directed side and adjacent the sides of the induction coil opposite from the sides adjacent to the second device.

16. The apparatus of claim 14, wherein the second device is capable of operating at a frequency at least about five times greater than the frequency at which the first device is capable of operating.

17. The apparatus of claim 14, wherein the second device is a hot-fluid ejection tube.

18. The apparatus of claim 14, wherein the first device is capable of producing a frequency and the second device is a device for producing radio waves having frequencies at least five times greater than the frequency of the first device.

19. A heating apparatus having a heat-directed side for heating a substrate having an electrically-conductive portion, a non-electrically-conductive portion, and an adhesive therebetween, the apparatus comprising:

(a) an induction coil having at least two passes, (b) a non-induction heating device capable of heating the non-electrically-conductive portion, the non-induction heating device being positioned between the at least two passes of the induction coil, (c) an insulating shield between the at least two passes of the induction coil and the non-induction heating device to help focus the energy generated by at least one of either the induction coil or the non-induction heating device to the substrate, (d) a focusing shield adjacent each side of the at least two passes of the induction coil opposite the non-induction heating device and adjacent each side of the at least two passes of the induction coil opposite the heat-directed side to assist in focusing the induction field created by the induction heating device to the substrate, and (e) means for holding the induction coil, the non-induction heating device, the insulating shield and the focusing shield together.

20. The apparatus of claim 19, wherein non-induction heating device is a hot-fluid ejection tube.

21. The apparatus of claim 19, wherein the non-induction heating device is a device for generating microwaves.

22. The apparatus of claim 19, wherein the non-induction heating device is a device for generating radio waves.

23. The apparatus of claim 19, wherein the non-induction heating device has two opposite sides which are perpendicular to the heat-directed side and the insulating shield is located on the two opposite sides of the non-induction heating device and extends beyond the non-induction heating device in the direction of the heat-directed side creating a channel adjacent the non-induction heating device in the direction of the heat-directed side.

24. The apparatus of claim 19, wherein the insulating shield encloses the non-induction heating device on three sides.

25. A heating apparatus having a heat-directed side for heating a substrate having an electrically-conductive portion and a non-electrically-conductive portion, the apparatus comprising:

(a) a low-frequency induction heating device, (b) a high-frequency heating device capable of being operated at a frequency at least about five times greater than the frequency at which the low-frequency induction heating device is capable of operating, (c) an insulating shield between the heating devices to help focus the energy generated by either of the heating devices to the substrate, (d) a focusing shield adjacent each side of at least one of the heating devices which is opposite the other heating device and adjacent each side of the at least one of the heating devices which is opposite the heat-directed side, the focusing shield to assist in focusing the field created by the at least one of the heating devices to the substrate, and (e) means for holding the heating devices, the insulating shield and the focusing shield together.

26. The heating apparatus of claim 25, further comprising:

(f) a low-frequency induction generator electrically connected to the low-frequency induction heating device, and (g) a high-frequency generator capable of supplying a frequency at least about five times greater than the frequency which the low-frequency induction generator is capable of supplying, the high frequency generator being electrically connected to the high-frequency heating device.

* * * * *